Figure 1:
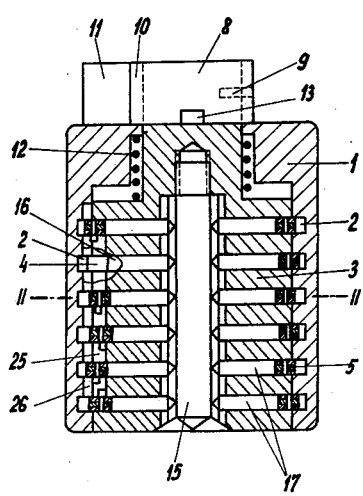

March 20, 1962

F. SMOGAR 3,025,695

CYLINDRIC SAFETY-LOCK

Filed Sept. 30, 1958

2 Sheets-Sheet 1

INVENTOR

Franjo Smogar

BY Michael S. Striker

ATTORNEY

March 20, 1962   F. SMOGAR   3,025,695
CYLINDRIC SAFETY-LOCK
Filed Sept. 30, 1958   2 Sheets-Sheet 2
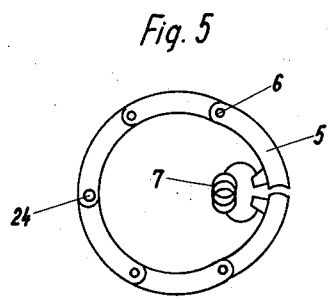
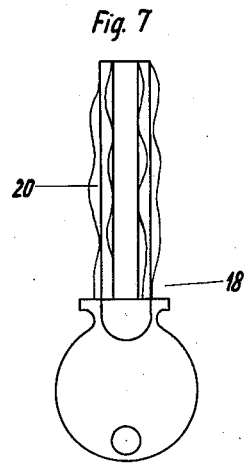
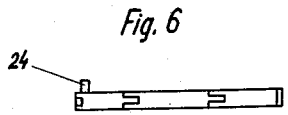
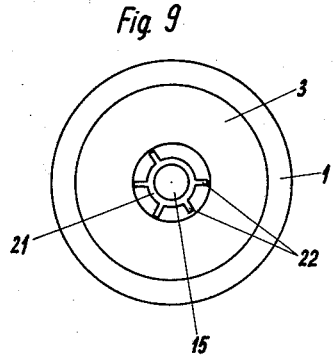
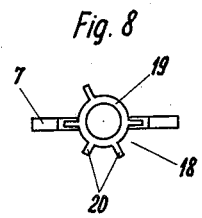
INVENTOR
Franjo Smogar
BY Michael S. Striker
ATTORNEY

United States Patent Office 3,025,695
Patented Mar. 20, 1962

3,025,695
CYLINDRIC SAFETY-LOCK
Franjo Smogar, Kate Dumbovića ul. 6,
Zagreb, Yugoslavia
Filed Sept. 30, 1958, Ser. No. 765,015
Claims priority, application Yugoslavia Oct. 5, 1957
7 Claims. (Cl. 70—360)

This invention is about a cylindric safety-lock, which owing to its original construction offers an extraordinary great number of different key combinations and guarantees the utmost safety against any unauthorized opening.

The cylindric safety-lock, constructed according to this invention, has locking rings which take an uncircular shape when the lock is closed, and which are situated partly in the parallel circular grooves on the casing of the inner cylinder and partly in the correspondent grooves on the inner surface of the external case. These circular grooves are of rectangular shape in cross-section.

When a key with several undulating key-bits is inserted into the keyhole, the uncircular locking rings become circular by means of several retaining pins. They are moved entirely into the grooves of the inner cylinder and form a smooth surface with the casing of the cylinder. Thus an axial shifting and then a rotation of the inner cylinder and of a connected ratchet is possible. For this purpose a spring is necessary which presses the inner cylinder outwards, in a position where the grooves on the inner cylinder and the grooves on the external case coincide and form a joint circular hole. A suitable shutting, consisting of a radial catch and of a corresponding groove on the external case and on the ratchet, respectively, is dissolved by the axial shifting of the inner cylinder and thus the rotation of the inner cylinder and of the ratchet is possible.

The locking rings may be constructed e.g. as articulated rings, which take an uncircular shape, or almost oval shape by the action of one or several springs. For this purpose the joints of the locking rings have to be situated exactly opposite to the detached key-bits and retaining pins. In order to prevent the rotation of the locking rings in relation to the inner cylinder, they have to be provided with a retaining device, e.g. a prolonged plug which gears together with a correspondent recess on the casing of the inner cylinder and with an axial groove on the inner surface of the external case, respectively. The locking rings may also be all of one piece, of an elastic material, such as steel wire or steel ribbon, of rectangular shape in cross-section, which take an uncircular form when unstressed.

An example of the cylindric safety-lock, according to this invention, is shown at the enclosed drawing.

Figure 2:
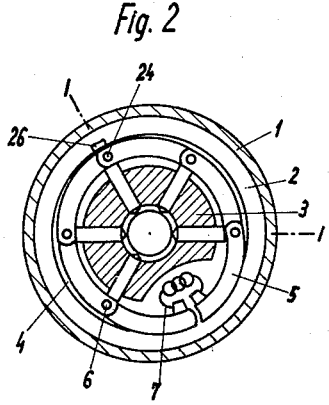

FIG. 1, the safety-lock when closed, longitudinal section conformably to the line I—I at FIG. 2.

FIG. 2, cross-section conformably to the line II—II at FIG. 1.

Figure 3:
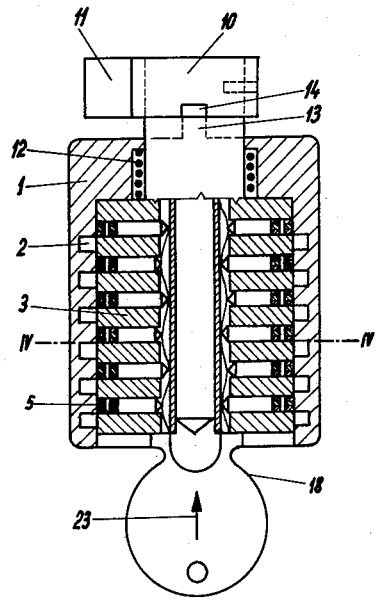
Figure 4:
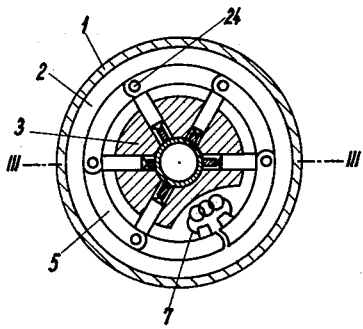

FIG. 3, the safety-lock with inserted key, in position before opening; longitudinal section conformably to the line III—III at FIG. 4.

FIG. 4, cross-section conformably to the line IV—IV at FIG. 3.

FIG. 5, an articulated locking ring consisting of several links, horizontal projection.

FIG. 6, the locking ring, vertical projection.

FIG. 7, the key, vertical projection.

FIG. 8, the key, horizontal projection.

FIG. 9, the cylindric safety-lock shown from below.

The cylindric safety-lock shown at FIGS. 1 and 2 consists of an external case 1, which has on its inner side several ring shaped grooves 2 of rectangular shape in cross-section. The inner cylinder 3 is provided with grooves 4, which correspond with the grooves 2 on the external case. In joint grooves, formed in this manner, articulated rings are situated, which consist of several links 5 and joints 6. The locking rings take an uncircular form by the action of the spring 7, when the safety-lock is closed (look also at FIG. 5), and thus an axial shifting of the inner cylinder 3 in relation to the external case 1 is prevented. A shell 10 with a ratchet 11 is fastened by a pin 9 to the outwardly prolonged plug 8 on the inner cylinder 3. A spiral spring 12 presses the inner cylinder 3 outwards, so that the shell 10 and the ratchet 11 lie close to the external case 1, and the grooves 2 and 4 are exactly facing one another. In this position it is impossible to rotate the inner cylinder 3 with the ratchet 11 in relation to the external case 1, as there is a cog 13 on the external case 1, which gears together with a detached axial groove 14 of the shell 10 on the ratchet 11. The inner cylinder 3 is provided with a conducting pivot 15 for the key. In the radial borings 16 on the inner cylinder there are retaining pins 17 of different length.

At FIGS. 3 and 4 the cylindric safety-lock is shown with the inserted key 18. The key has, according to FIGS. 7 and 8, several undulated key-bits 20 on a central cylindrical body 19, the number of which correspond to the number of rows of retaining pins 17. For the correct insertion of the key 18 into the lock, there is a round hole with radial slits on the front side of the inner cylinder 3, according to FIG. 9. By the insertion of the key 18 the retaining pins 17 are shifted at least partly in axial direction, whereby all locking rings take an entirely circular form and are moved totally into the grooves 4 on the inner cylinder 3. Hereupon the inner cylinder 3, by pressing in the direction shown by the arrow 23, can be moved against the action of the spring 12 into the external case 1, which position is shown at FIG. 3, whereby the shutting formed by the cog 13 on the external case 1 and the groove 14 on the shell 10 of the ratchet 11 is dissolved and the inner cylinder 3 can thus be rotated together with the ratchet 11, by what the lock is opened.

During the rotation of the inner cylinder 3 in relation to the external case 1, the locking rings 5, 6, which are in the grooves 4 on the inner cylinder 3, have to remain unshifted, because they have to get into the same position again when the lock is being closed by retrograde rotation. It is necessary that the joints 6 and the detached retaining pins 17 face exactly one another, because only then the locking rings will be able to take a circular form by the retaining pins 17 at the subsequent opening of the lock. This demand is met by a prolongation at one side of the connecting plug 24 of the joint 6, which is arranged suitably opposite to the spring 7 (FIG. 6). The connecting plug is situated in a recess 25 on the casing of the inner cylinder 3, when the key is inserted, and next to the radial boring 14, but in an axially running groove 26 on the inner casing of the external case 1 (FIG. 1), when the lock is closed and there is no key inserted, whereby the locking ring is deformed into a nearly oval form.

This invention is not restricted to the described example only. In particular it is possible, as already mentioned, to apply locking rings constructed differently, instead of articulated locking rings, such as rings made of an elastic and sufficiently strong material, e.g. steel wire or steel ribbon. The shutting which prevents the rotation of the inner cylinder in relation to the external case when the lock is closed, could be arranged differently, e.g. hidden between the external case and the inner cylinder.

I claim:

1. In a lock in combination, a tubular body member formed with at least one groove in the inner surface thereof; a cylindrical member mounted for rotation in said tubular body member and slidable in axial direction therein between a locking position and an unlocking position, said cylindrical member formed on the outer surface thereof with at least one groove located in said locking position of said cylindrical member in register with said groove in the inner surface of said tubular body member; and deformable locking means including a plurality of link means having end portions connected to each other for relative turning movement, movable between a first configuration in which said deformable locking means is located in the grooves of both said members to prevent relative axial sliding of said members and a second configuration in which said deformable locking means is located in the groove of one of said members only allowing axial sliding movement of said members relative to each other, said locking means having permanently the tendency to adapt said first configuration.

2. In a lock combination, a tubular body member formed with at least one groove in the inner surface thereof; a cylindrical member mounted for rotation in said tubular body member and slidable in axial direction therein between a locking position and an unlocking position, said cylindrical member formed on the outer surface thereof with at least one groove located in said locking position of said cylindrical member in register with said groove in the inner surface of said tubular body member; deformable locking means including a plurality of link means having end portions connected to each other for relative turning movement, movable between a first configuration in which said deformable locking means is located in the grooves of both said members to prevent relative axial sliding of said members and a second configuration in which said deformable locking means is located in the groove of said cylindrical member only allowing axial sliding movement of said members relative to each other; and biassing means urging said deformable locking means into said first configuration.

3. In a lock combination, a tubular body member formed with a plurality of grooves in the inner surface thereof; a cylindrical member mounted for rotation in said tubular member and slidable in axial direction therein between a locking position and an unlocking position, said cylindrical member formed on the outer surface thereof with a plurality of grooves located in said locking position of said cylindrical member in register with said grooves in the inner surface of said tubular member; a plurality of deformable locking means including a plurality of link means having end portions connected to each other for relative turning movement movable between a first configuration in which said plurality of deformable locking means are respectively located in the grooves of both members to prevent relative axial sliding movement of said members and a second configuration in which said plurality of deformable locking means are respectively located in the grooves of one of said members only allowing axial sliding movement of said members relative to each other; and biassing means urging said plurality of deformable locking means into said first configuration.

4. In a lock combination, a tubular body member formed with a plurality of grooves in the inner surface thereof; a cylindrical member mounted for rotation in said tubular member and slidable in axial direction therein between a locking position and an unlocking position, said cylindrical member formed on the outer surface thereof with a plurality of grooves located in said locking position of said cylindrical member in register with said grooves in the inner surface of said tubular member; a plurality of deformable locking means including a plurality of link means having end portions connected to each other for relative turning movement, movable between a first configuration in which said plurality of deformable locking means are respectively located in the grooves of both members to prevent relative axial sliding movement of said members and a second configuration in which said plurality of deformable locking means are respectively located in the grooves of one of said members only allowing axial sliding movement of said members relative to each other; biassing means urging said plurality of deformable locking means into said first configuration; and key unlocking means engaging said plurality of deformable locking means for moving the same from said first configuration into said second configuration thereof against the bias of said biassing means, whereby movement of said plurality of unlocking means will move said deformable locking means from said first configuration into said second configuration thereof to free the grooves of one of said members from said plurality of deformable locking means and allow relative axial sliding movement between said members.

5. In a lock combination, a tubular body member formed with a plurality of grooves in the inner surface thereof; a cylindrical member mounted for rotation in said tubular member and slidable in axial direction therein between a locking position and an unlocking position, said cylindrical member formed on the outer surface thereof with a plurality of grooves located in said locking position of said cylindrical member in register with said grooves in the inner surface of said tubular member; a plurality of deformable locking means including a plurality of link means having end positions connected to each other for relative turning movement movable between a first configuration in which said plurality of deformable locking means are respectively located in the grooves of both members to prevent relative axial sliding movement of said members and a second configuration in which said plurality of deformable locking means are respectively located in the grooves of said cylindrical member, only allowing axial sliding movement of said members relative to each other; biassing means urging said plurality of deformable locking means into said first configuration; and key unlocking means engaging said plurality of deformable locking means for moving the same from said first configuration into said second configuration thereof against the bias of said biassing means, whereby movement of said unlocking means will move said plurality of deformable locking means from said first configuration into said second configuration thereof to free the grooves of one of said members from said plurality of said deformable locking means and allow relative axial sliding movement between said members.

6. In a lock combination, a tubular body member formed with a plurality of grooves in the inner surface thereof; a cylindrical member mounted for rotation in said tubular member and slidable in axial direction therein between a locking position and an unlocking position, said cylindrical member formed on the outer surface thereof with a plurality of grooves located in said locking position of said cylindrical member in register with said grooves in the inner surface of said tubular member; a plurality of deformable locking means including a plurality of link means, one of said link means being resilient, and said plurality of link means having end portions connected to each other for relative turning movement, movable between a first configuration in which said plurality of deformable locking means are respectively located in the grooves of both members to prevent relative axial sliding movement of said members and a second configuration in which said plurality of deformable locking means are respectively located in the grooves of one of said members only allowing axial sliding movement of said members relative to each other; means constraining one end portion of said link means from movement out of the groove on one of said members; and operating means engaging said plurality of deformable locking means for moving the same from said first configuration into said second configuration thereof against the bias of said biassing means.

7. In a lock in combination; a tubular body member formed with a first annular groove in the inner surface thereof and a second groove in the inner surface thereof; a cylindrical member mounted for rotation in said tubular body member and slidable in axial direction therein between a locking position and an unlocking position, said cylindrical member formed on the outer surface thereof with an annular groove located in said locking position of said cylindrical member in register with said first groove in the inner surface of said tubular body member and formed on the outer surface thereof with a recess located in said locking position of said cylindrical member opposite said second groove in said tubular body member; deformable locking means including a plurality of link means having end portions connected to each other for relative turning movement movable between a first configuration in which said deformable locking means is located in said first groove of said tubular body member and said second groove in said cylindrical member to prevent relative axial sliding of said member and a second configuration in which said deformable locking means is located in said groove of said cylindrical member only allowing axial sliding movement of said members relative to each other, said locking means having permanently the tendency to assume said first configuration; and a plug secured to one of said link means and disposed in said second groove in said tubular body member when said plurality of link means is in said first configuration to prevent shifting of said plurality of link means and disposed in said recess in said cylindrical member when said plurality of link means is in said second configuration to prevent shifting of said plurality of link means.

References Cited in the file of this patent

UNITED STATES PATENTS

| | | |
|---|---|---|
| 1,444,429 | Rogginger | Feb. 6, 1923 |
| 2,206,539 | Swanson | July 2, 1940 |
| 2,552,294 | Patrignani | May 8, 1951 |

FOREIGN PATENTS

| | | |
|---|---|---|
| 87,515 | Switzerland | Dec. 16, 1920 |
| 509,991 | Canada | Feb. 8, 1955 |